(12) United States Patent
Murray et al.

(10) Patent No.: US 11,468,635 B2
(45) Date of Patent: Oct. 11, 2022

(54) METHODS AND APPARATUS TO FACILITATE 3D OBJECT VISUALIZATION AND MANIPULATION ACROSS MULTIPLE DEVICES

(71) Applicant: Vertex Software LLC, Des Moines, IA (US)

(72) Inventors: Daniel Murray, Ames, IA (US); James Zwica, Ames, IA (US); Jeffrey Murray, Ames, IA (US); Steven Ourada, Ames, IA (US)

(73) Assignee: Vertex Software, Inc., Des Moines, IA (US)

( * ) Notice: Subject to any disclaimer, the term of this patent is extended or adjusted under 35 U.S.C. 154(b) by 0 days.

(21) Appl. No.: 17/200,304

(22) Filed: Mar. 12, 2021

(65) Prior Publication Data

US 2021/0201574 A1 Jul. 1, 2021

Related U.S. Application Data

(63) Continuation of application No. 16/257,393, filed on Jan. 25, 2019, now Pat. No. 10,950,044.

(60) Provisional application No. 62/622,075, filed on Jan. 25, 2018.

(51) Int. Cl.
*G06T 17/20* (2006.01)
*G06T 3/00* (2006.01)
*G06T 15/20* (2011.01)
*G06F 16/53* (2019.01)
*G06F 30/00* (2020.01)

(52) U.S. Cl.
CPC .............. *G06T 17/20* (2013.01); *G06F 16/53* (2019.01); *G06F 30/00* (2020.01); *G06T 3/0037* (2013.01); *G06T 15/20* (2013.01)

(58) Field of Classification Search
CPC ........ G06T 17/20; G06T 3/0037; G06T 15/20
See application file for complete search history.

(56) References Cited

U.S. PATENT DOCUMENTS

| 5,729,671 A | 3/1998 | Peterson et al. |
| 2012/0139916 A1 | 6/2012 | Collin et al. |
| 2013/0300740 A1 | 11/2013 | Snyder et al. |
| 2015/0006360 A1 | 1/2015 | Kumar et al. |
| 2015/0015582 A1 | 1/2015 | Kaiser et al. |

(Continued)

OTHER PUBLICATIONS

Baker, Dan, "Object Space Lighting", Game Developers Conference, Mar. 14, 2016 (Mar. 14, 2016), pp. 1-62, URL:https://www.oxidegames.com/wp-content/uploads/2016/03/Object-Space-Lighting-Rev-21.pdf.

(Continued)

*Primary Examiner* — Matthew Salvucci
(74) *Attorney, Agent, or Firm* — William J. Lenz; Neal, Gerber & Eisenberg LLP

(57) ABSTRACT

Methods and apparatus to facilitate 3D object visualization and manipulation across multiple devices are disclosed. Example apparatus disclosed herein include a viewpoint determiner, a visible shard determiner, and a laminate assembler. The viewpoint determiner determines a viewpoint location of a viewpoint corresponding to a viewing device, the viewpoint location being in a reference frame of a three-dimensional (3D) model. The visible shard determiner determines a visible shard set of the 3D model based on the viewpoint location. The laminate assembler generates a two-dimensional (2D) image of the visible shard set.

9 Claims, 15 Drawing Sheets

(56) References Cited

U.S. PATENT DOCUMENTS

2016/0284018 A1 9/2016 Adeyoola et al.

OTHER PUBLICATIONS

Kauker, Daniel, et al., "VoxLink-Combining sparse volumetric data and geometry for efficient rendering", Computational Visual Media, vol. 2, No. 1, Mar. 1, 2016 (Mar. 1, 2016), pp. 45-56, ISSN: 2096-0433, DOI: 10.1007/s41095-016-0034-8.
Shi, Shu, et al., "A real-time remote rendering system for interactive mobile graphics", ACM Transactions on Multimedia Computing, Communications, and Applications, vol. 8, No. 3s, Sep. 1, 2012 (Sep. 1, 2012), pp. 1-20, ISSN: 1551-6857, DOI: 10.1145/2348816.2348825.
Zhu, Minhui, et al., "Sprite tree: an efficient image-based representation for networked virtual environments", Visual Computer, vol. 33, No. 11, Jul. 11, 2016 (Jul. 11, 2016), pp. 1385-1402, Springer ISSN: 0178-2789, DOI: 10.1007/S00371-016-1286-0.
International Search Report and Written Opinion for PCT/US2019/015101 dated Apr. 22, 2019.

METHODS AND APPARATUS TO FACILITATE 3D OBJECT VISUALIZATION AND MANIPULATION ACROSS MULTIPLE DEVICES

CROSS-REFERENCE TO RELATED APPLICATION

This application is a continuation application of, claims the benefit of and priority to U.S. patent application Ser. No. 16/257,393, filed on Jan. 25, 2019, which claims the benefit of and priority to U.S. Provisional Patent Application No. 62/622,075, filed on Jan. 25, 2018, each of which are incorporated herein by reference in their entirety.

FIELD OF THE DISCLOSURE

This disclosure relates generally to three-dimensional (3D) computer graphics, and, more particularly, to methods and apparatus to facilitate 3D object visualization and manipulation across multiple devices.

BACKGROUND 3D geometric models are often used to design products for manufacture (e.g., in architecture, construction, real estate, gaming, healthcare, scientific visualization, movies, etc.). During the design process, iterative changes to a 3D model are often made by electronically sending an updated 3D model file back and forth between designers (e.g., engineers, technicians, draftspeople, etc.). However, 3D model file sizes are often too large to be sent via conventional email and/or require long time periods to transfer from a sender to a recipient. Thus, current 3D design processes utilize specialized file transfer protocols (FTP) or shared local or hosted network storage between designers and/or wait for extended periods for large 3D files to transfer.

SUMMARY

An example apparatus is disclosed. The example apparatus includes a viewpoint determiner, a visible shard determiner, and a laminate assembler. The viewpoint determiner determines a viewpoint location of a viewpoint corresponding to a viewing device, the viewpoint location being in a reference frame of a 3D model in a virtual 3D environment. The visible shard determiner determines a visible shard set of the 3D model based on the viewpoint location. The laminate assembler generates a two-dimensional (2D) image based on the visible shard set.

An example method is disclosed. The example method includes determining, by executing an instruction with a processor, a viewpoint location of a viewpoint corresponding to a viewing device, the viewpoint location being in a reference frame of a 3D model; determining, by executing an instruction with the processor, a visible shard set of the 3D model based on the viewpoint location; and generating, by executing an instruction with the processor, a 2D image based on the visible shard set.

An example tangible computer readable medium comprising example instructions for execution by a processor is disclosed herein. When executed, the example instructions cause the processor to: determine a viewpoint location of a viewpoint corresponding to a viewing device, the viewpoint location being in a reference frame of a 3D model; determine a visible shard set of the 3D model based on the viewpoint location; and generate a 2D image based on the visible shard set.

BRIEF DESCRIPTION OF THE DRAWINGS

The figures are not to scale. Wherever possible, the same reference numbers will be used throughout the drawings and accompanying written description to refer to the same or like parts.

DETAILED DESCRIPTION

Figure 1:
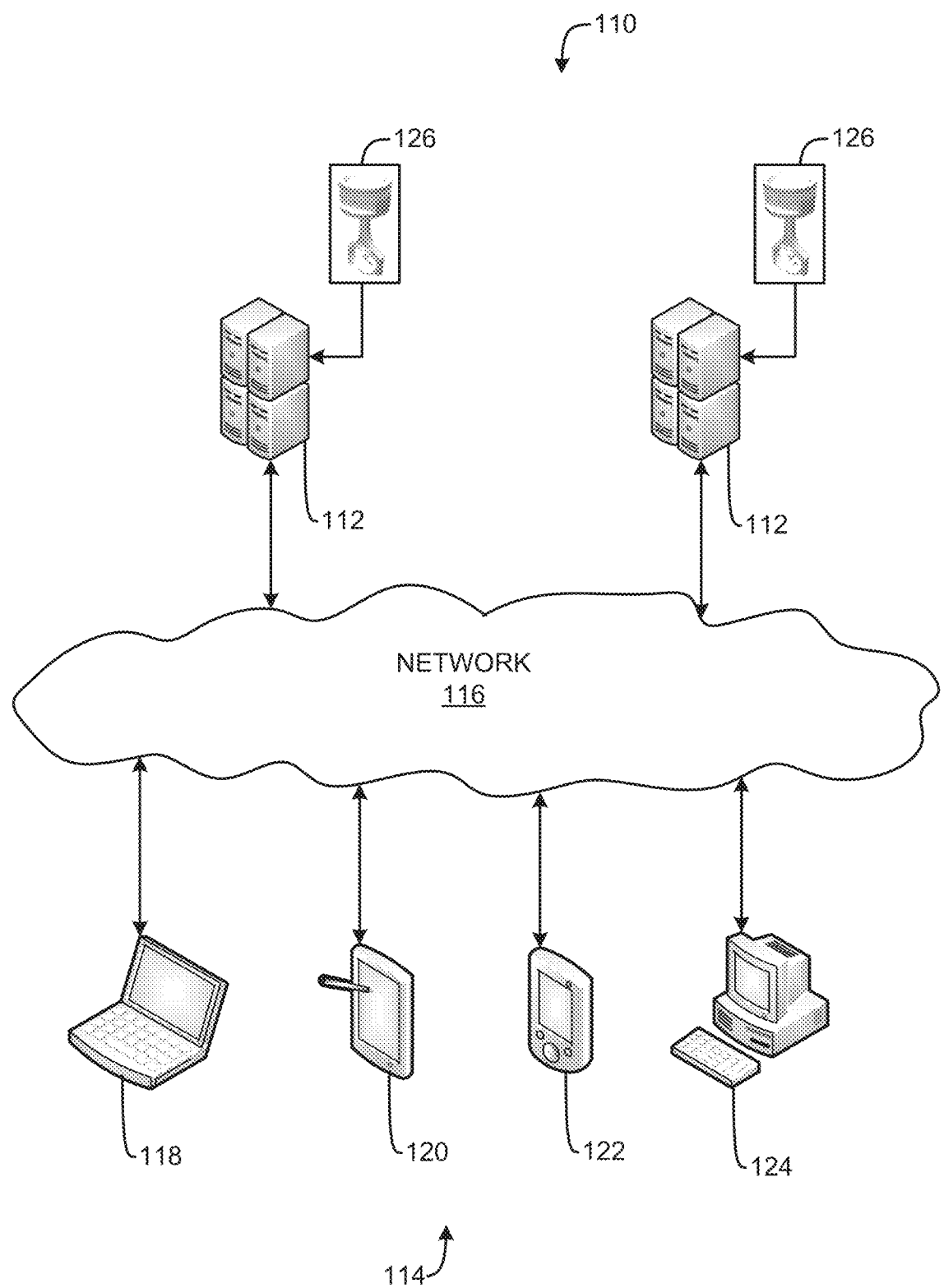
FIG. 1 illustrates an example environment as disclosed herein.

FIG. 1 illustrates an example environment 110 as disclosed herein. In the illustrated examples of FIG. 1, the environment 110 includes at least one server 112, at least one viewing device 114, and a network 116. In the illustrated example of FIG. 1, the at least one viewing device 114 is a plurality of viewing devices 114 that includes a laptop computer 118, a tablet 120, a mobile device 122 (e.g., a smartphone), and a desktop computer 124. It should be understood that the viewing devices 114 may include more or fewer viewing devices than the example laptop computer 118, the example tablet 120, the example mobile device 122, and the example desktop computer 124 shown in FIG. 1 in any combination of viewing devices types. In other words, the number of viewing devices 114 included in the environment 110 is not limited to the number and combination of viewing devices shown in FIG. 1 (e.g., the laptop computer 118, the tablet 120, the mobile device 122, and the desktop computer 124). The network 116 may be any type of electronic data transfer system (e.g., the Internet, an intranet, a local area network (LAN), etc.).

As shown in the illustrated example of FIG. 1, the viewing devices 114 are connected with the servers 112 via the network 116. The viewing devices 114 may further be connected with one another via the network 116. In the illustrated example of FIG. 1, 3D model files 126 and/or portions of 3D model files 126 are stored on the servers 112. In operation, 2D renderings of the 3D model files are displayed on the viewing devices 114 via the network 116, as will be explained in greater detail below in conjunction with FIGS. 2-12.

Figure 2:
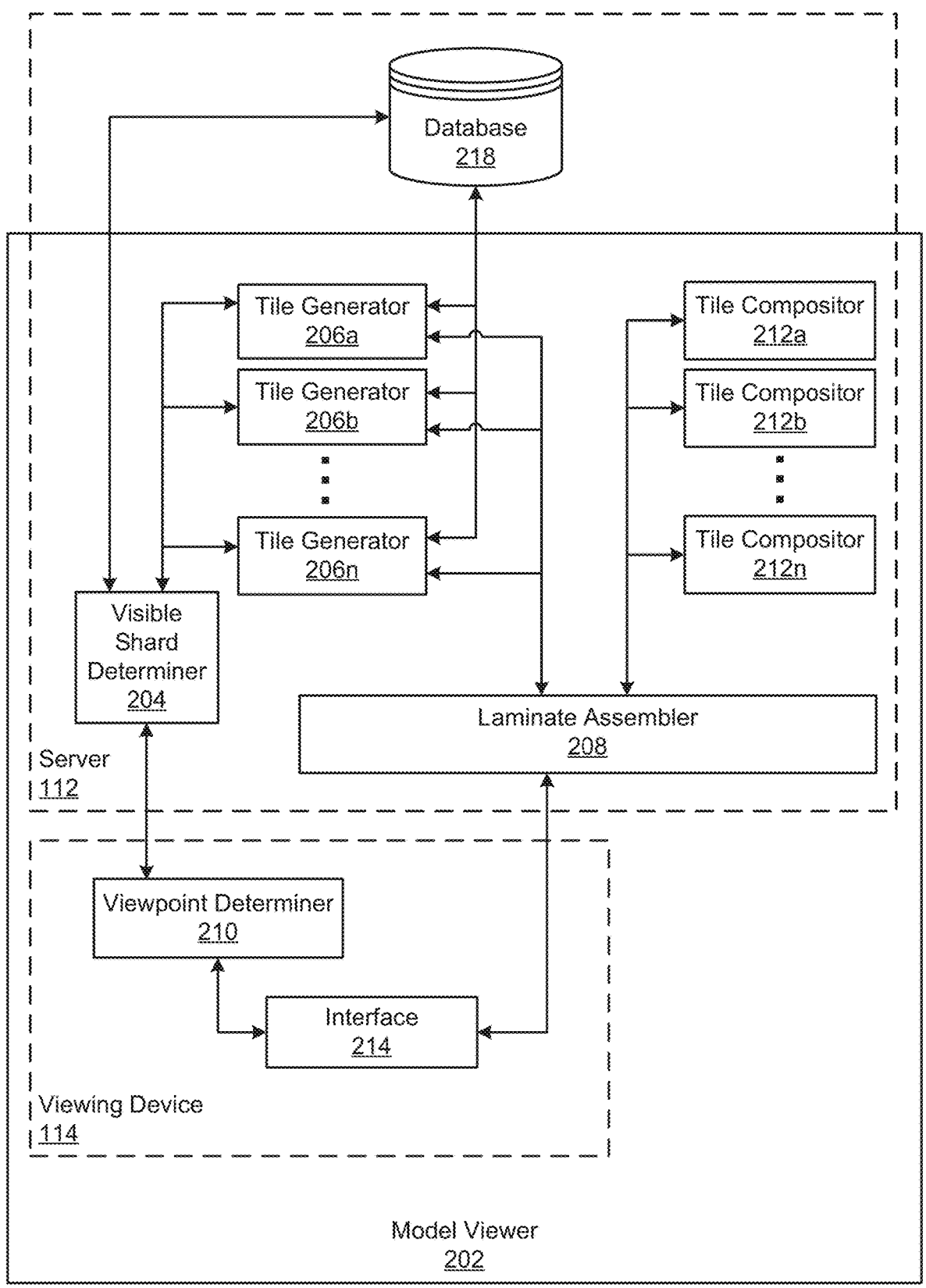
FIG. 2 is a block diagram of an example model viewer used in the example environment of FIG. 1.

FIG. 2 is a block diagram of an example model viewer 202 used in the example environment 110 of FIG. 1. In the illustrated example of FIG. 2, the model viewer 202 includes a visible shard determiner 204, a plurality of tile generators 206a to 206n, a laminate assembler 208, a viewpoint determiner 210, a plurality of tile compositors 212a to 212n, and an interface 214. It should be understood that the example tile generators 206a to 206n are substantially identical. It should be further understood that the model viewer 202 may have any number of tile generators 206. It should be understood that the example tile compositors 212a to 212n are substantially identical. It should be further understood that the model viewer 202 may have any number of tile compositors 206. In the illustrated example of FIG. 2, the model viewer is in communication with a database 218. The visible shard determiner 204, the tile generators 206a to 206n, the laminate assembler 208, the tile compositors 212a to 212n, and the database 218 may be stored in one or more of the servers 112 of FIG. 1. In the illustrated example of FIG. 2, the viewpoint determiner 210 and the interface 214 may be stored in the one of the viewing devices 114 of FIG. 1. Thus, the model viewer 202 is stored on the servers 112 (e.g., a back end) and the viewing devices 114 (e.g., front ends).

In the illustrated example of FIG. 2, the visible shard determiner 204 is in communication with the tile generators 206a to 206n, with the viewpoint determiner 210, and with the database 218. The tile generators 206a to 206n are further in communication with the laminate assembler 208 and with the database 218. The tile compositors 212a to 212n are in communication with the laminate assembler 208. The interface 214 is in communication with the laminate assembler 208 and with the viewpoint determiner 210.

In operation, the interface 214 receives display inputs from the viewing devices 114. The display inputs include movement inputs (e.g., via a mouse, keys, a touchscreen, a scroll wheel, etc.). The viewpoint determiner 210 determines where to move viewpoints of the viewing devices 114 in a reference frame about a 3D model based on the movement inputs, as will be explained in greater detail in conjunction with FIGS. 3-8. The visible shard determiner 204 accesses the database 218 to determine which shards of a 3D model (e.g., the 3D model 126 of FIG. 1) are visible based on the determined viewpoint, as will be explained in greater detail in conjunction with FIGS. 3-8. The tile generators 206a to 206n generate depth and color data of the determined visible shards and render the visible shards into tiles (flattened 2D images), as will be explained in greater detail in conjunction with FIGS. 9-11. The tile generators 206a to 206n communicate the tiles and their respective color and depth data to the laminate assembler 208. The laminate assembler 208 sends pairs of tiles and their respective color and depth data to the tile compositors 212a to 212n. The tile compositors 212a to 212n compare the depth data of the tiles to generate a composite tile using color data selected based on the depth comparison, as will be explained in greater detail in conjunction with FIGS. 9-11. The tile compositors 212a to 212n deliver the composite tiles to the laminate assembler 208. The laminate assembler 208 continues to send individual tiles and composite tiles to the tile compositors 212a to 212n until all tiles originally generated by the tile generators 206a to 206n are combined into a single 2D composite tile, referred to as a laminate, as will be explained below in conjunction with FIGS. 9-11. The laminate assembler 208 communicates the laminate image to the interface 214. The interface 214 displays the laminate on one of the of the viewing devices 114.

Figure 3:
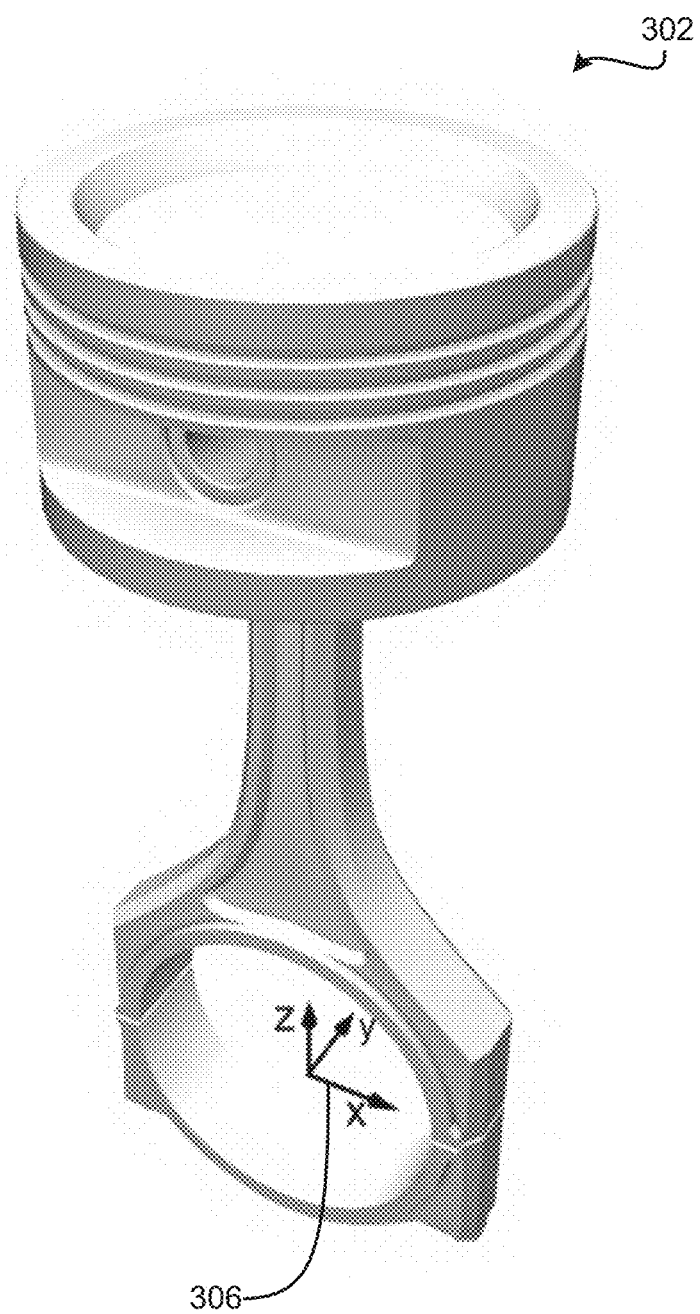
FIG. 3 illustrates an example 3D model.
Figure 4:
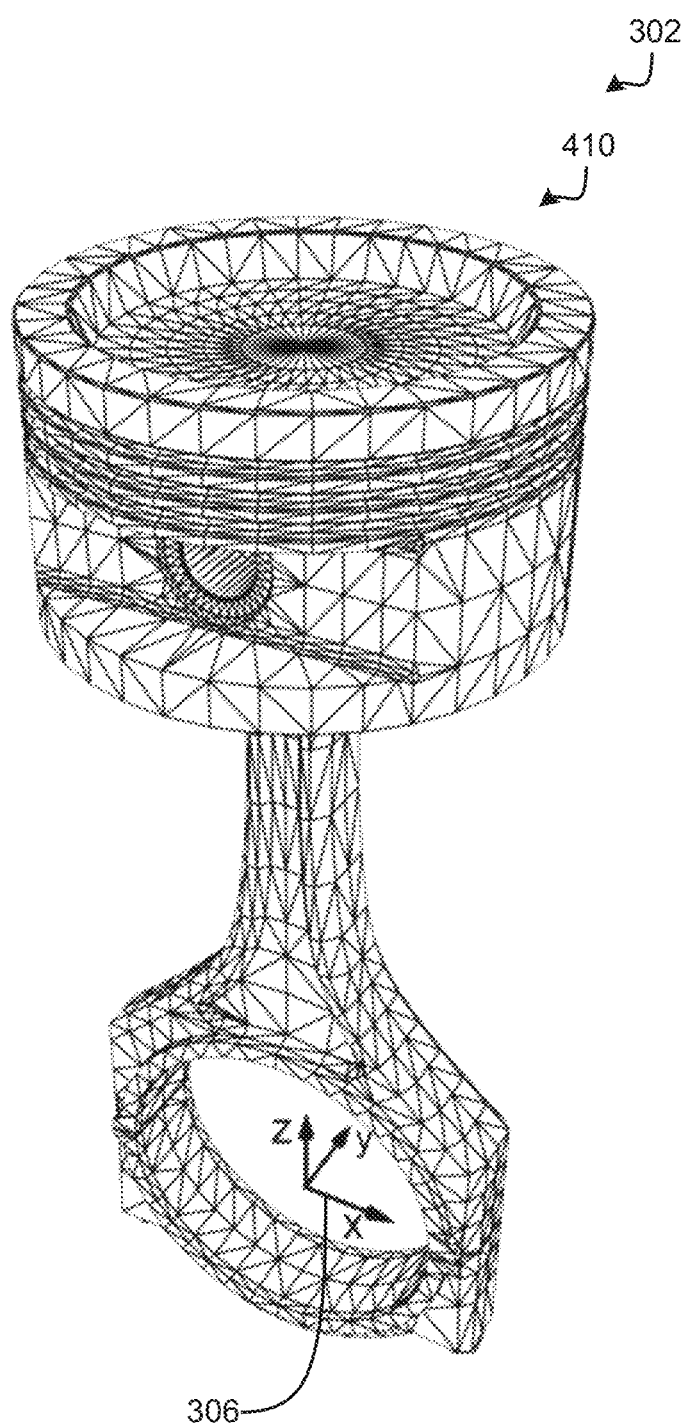
FIG. 4 illustrates the example 3D model of FIG. 3 represented as triangles.
Figure 5:
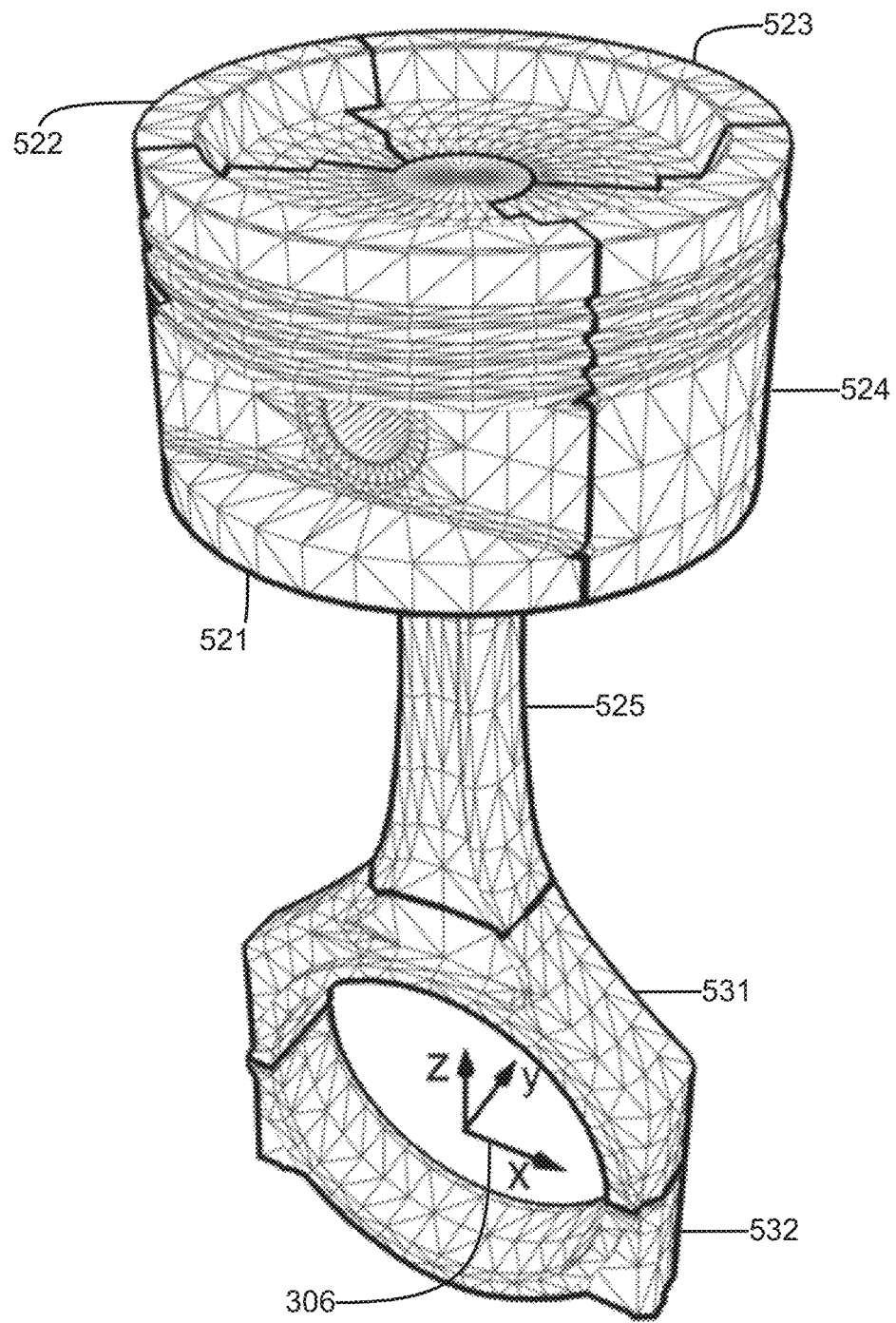
FIG. 5 illustrates the example 3D model of FIGS. 3 and 4 represented as triangles grouped into shards.
Figure 6:
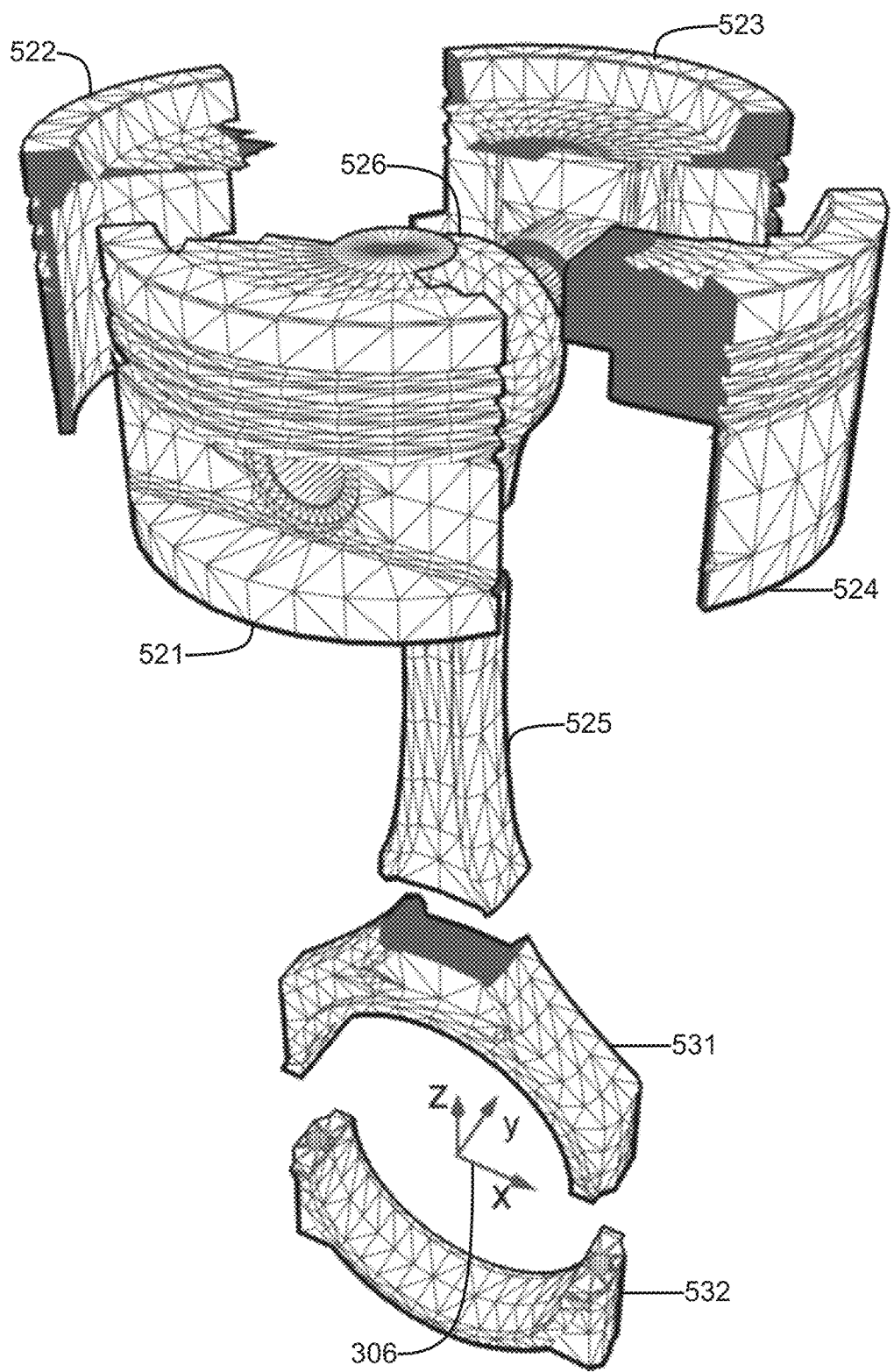
FIG. 6 is an exploded view of the example 3D model of FIG. 5.
Figure 7:
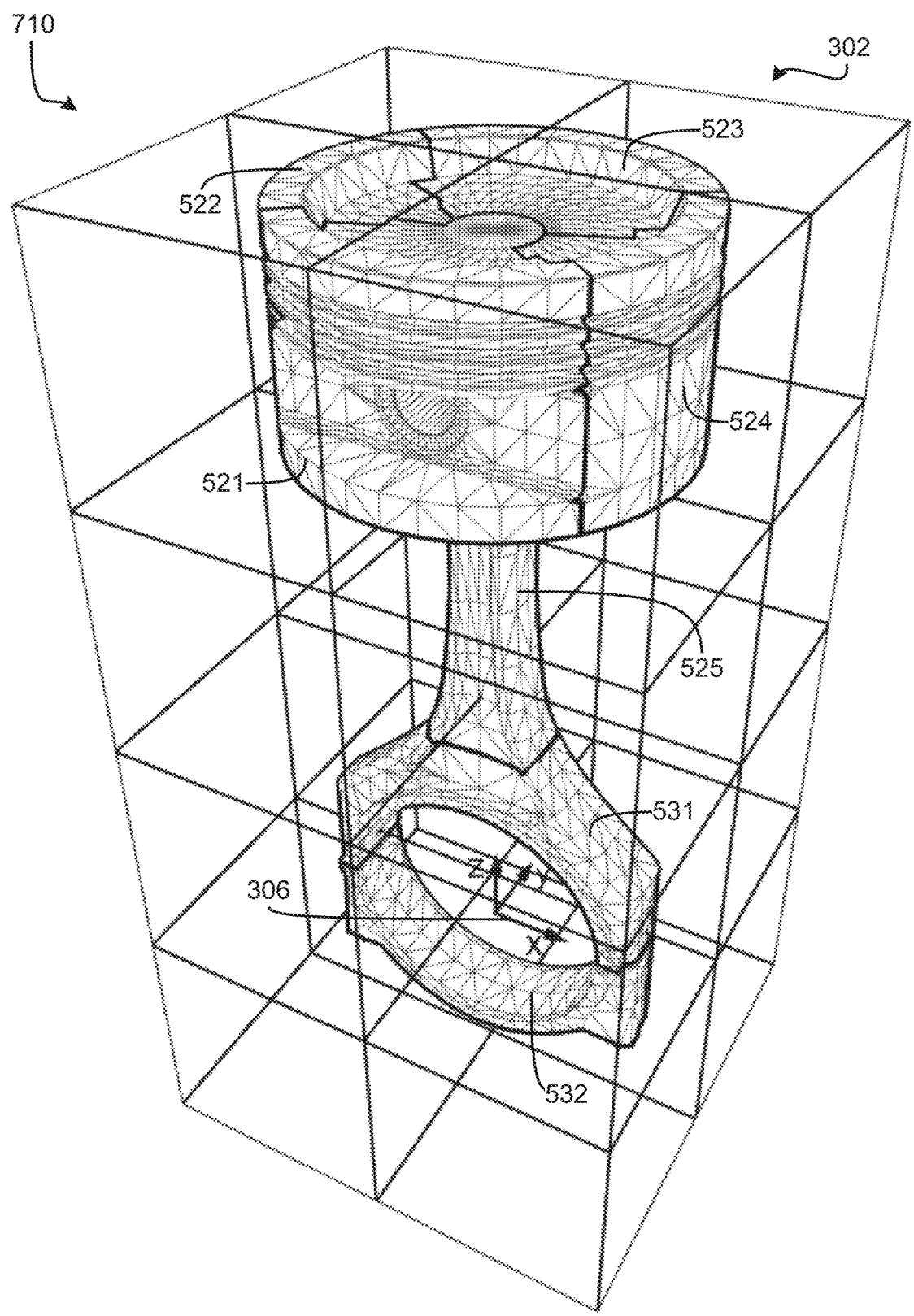
FIG. 7 illustrates the example 3D model of FIGS. 3-5 occupying a plurality of voxels.

FIG. 3 illustrates an example 3D model 302. FIG. 4 illustrates the example 3D model 302 represented as triangles 410. FIGS. 5 and 6 illustrate the example 3D model 302 represented as triangles 410 grouped into first, second, third, fourth, fifth, sixth, seventh, and eighth shards 521, 522, 523, 524, 525, 526, 531, 532. FIG. 7 illustrates the example 3D model 302 occupying a plurality of voxels 710. In the examples of FIGS. 3-11, the example 3D model 302 depicts a piston and connecting rod assembly. In the illustrated examples of FIGS. 3-11, the 3D model 302 and the first, second, third, fourth, fifth, sixth, seventh, and eighth shards 521, 522, 523, 524, 525, 526, 531, 532 are disposed in a reference frame 306. The example reference frame 306 is three-dimensional Cartesian. It should be understood that the example 3D model 302 may be disposed in any type of 3D reference frame (e.g., cylindrical, spherical, etc.).

At a high level, examples disclosed herein may include taking a large 3D model file (or many 3D models) and breaking the 3D model file into smaller components referred to as shards that can be processed independently to determine a 2D laminate image to be displayed to a given user or viewing device. In practice, this may first include processing the 3D model to generate a plurality of triangles or other polygons, which is sometimes referred to as tessellation. The examples disclosed herein may be described with reference to triangles. However it should be understood that any object for which an intersection with a ray may be determined can be used, including polygons, boundary representations (B-reps or BREPS), constructive solid geometry (CSG) trees, cones, etc. (e.g., model primitives). The triangles or other model primitives are then grouped into one or more shards. The triangles may be two dimensional (2D) with respect to the plane defined by their vertices, or may be understood as 3D with respect to a reference frame, may have a set size or variable size, and when combined may form a mesh or surface that follows the contours of the 3D model. In some examples there may be hundreds, thousands, millions, or more triangles that represent a given model. The number and density of triangles may be changed to allow for greater or lesser resolution of the 3D model. For instance, a simple 3D model may have fewer triangles than a more complex model, to allow for greater definition of the contours of the complex model. Further, the complex model may include a greater density of triangles to account for relatively small features of the model. In some examples, the number and density of triangles may vary across the model, such that more complex areas are represented by a greater number and/or greater density of triangles.

Triangles may be grouped together and combined into shards (e.g., the first, second, third, fourth, fifth, sixth, seventh, and eighth shards 521, 522, 523, 524, 525, 526, 531, 532). The number of triangles per shard may vary, and in some cases there may be an upper limit such as twenty thousand triangles per shard. Other numbers, limits, and ranges are possible as well. The number of triangles per shard may affect one or more processing benchmarks or metrics, and as such may be changed or dynamically modified to maintain a particular frame rate or processing speed, for example. Further, the density of the triangles may affect the size and shape of each shard.

To determine which triangles are grouped into a given shard, one or more processing techniques may be used. In some examples, the triangles may be grouped based on a particular component of the 3D model. For instance, a 3D model may have multiple components (e.g., a cylinder with a handle may comprise two components—the cylinder and the handle), and all the triangles corresponding to a given component may be grouped into a shard. Alternatively, one or more components may include a greater number of triangles than can be grouped into a single shard, and as such a component may be represented by multiple shards. This may occur with a component is large, complex, or is shown in high resolution or detail. Further, a single shard represent multiple components. Thus, a single shard may include triangles that represent a single component, part of a component, or multiple components.

There are multiple techniques for grouping the triangles into shards. In one example, adjacent triangles may be grouped together to form a shard. This technique may be based on triangle adjacency. In another example, edge walking may be used to determine groupings, wherein a first triangle is selected and additional triangles are selected by moving along an edge to a next triangle. In general, techniques such as nearest-neighbor grouping or hierarchical clustering may be used. These techniques may involve organizing the triangles or other geometric primitives into a hierarchical structure that describes the proximity of each triangle to one or more other triangles. The hierarchical structure may be analyzed and used to group the triangles into clusters based on one or more features, which may in turn result in a grouping of a given number of triangles into a shard. Further, in some examples triangles may be grouped based on the component they represent, or other metadata associated with the triangles. Once the shards are determined, they may be stored in a database for later use. FIGS. 5 and 6 show that the number, size, density, and other characteristics of the triangles 410 may differ within a shard and across shards of the represented object.

In some examples, a 3D model may be broken into triangles and shards which may be stored on a single device, across multiple devices, and/or redundantly across multiple devices.

Figure 8:
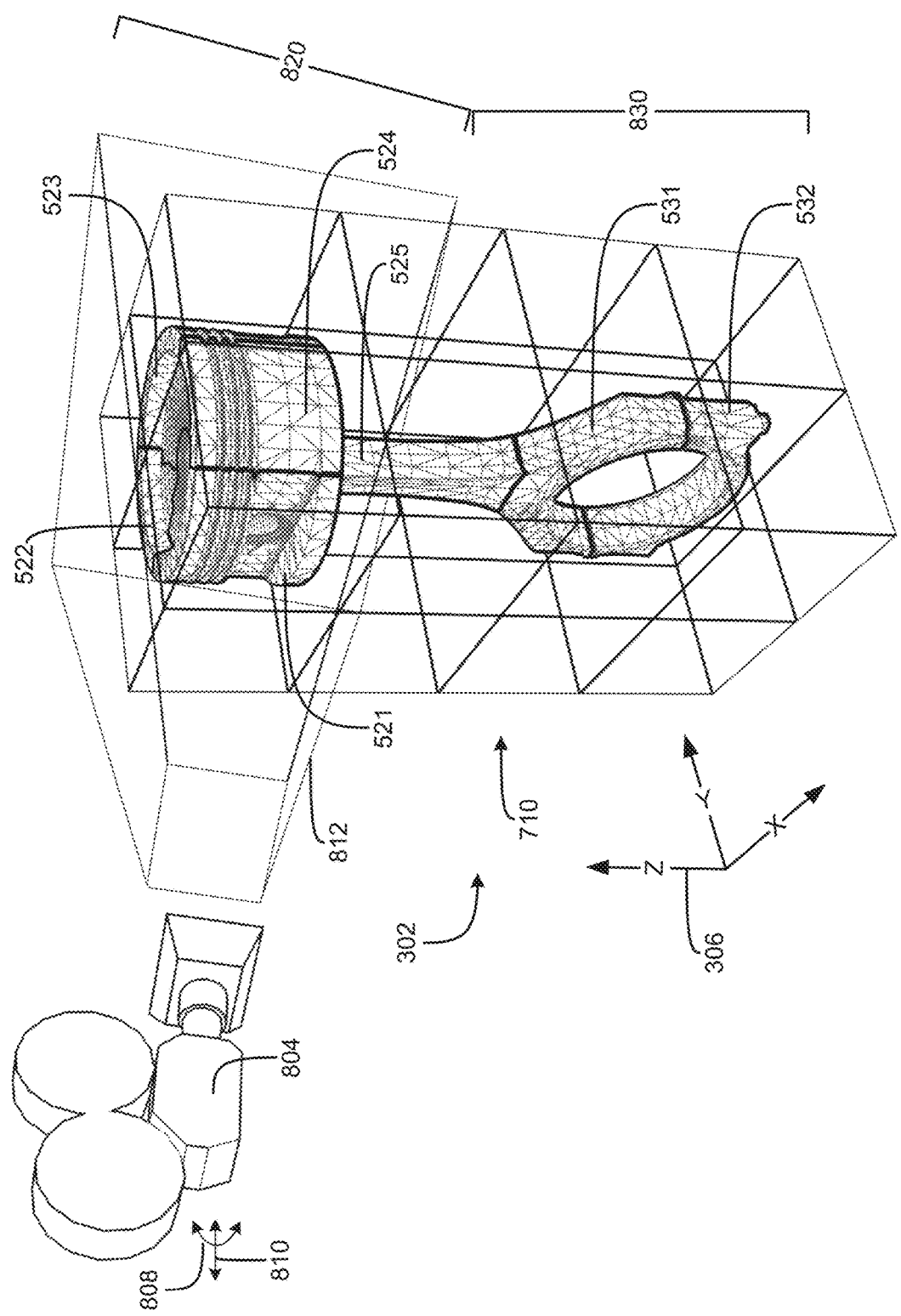
FIG. 8 illustrates the example 3D model viewed by a viewpoint via the model viewer of FIG. 2.

In order to display a laminate or 2D image of a given object to a user, example embodiments may include receiving information from the user device (e.g., a viewpoint, viewing position, or orientation) which may be used to determine or generate a laminate. FIG. 8 shows an example viewpoint position 804. This process may include several steps, which may include (i) determining a viewpoint position/orientation with respect to the 3D model, (ii) determining which shard(s) are visible from the determined position, (iii) generating a plurality of processing tasks for generating 2D images of the visible shard(s), (iv) combining the generated 2D images into a single image to be presented to the viewing device. These steps are discussed in further detailed below.

First, a position, orientation, or other spatial orientation data of the viewing device requesting the laminate may be determined. This information may be transmitted from the viewing device to the model viewer or processing device via the interface. Where the system includes multiple users viewing a given model on multiple devices, an ID of a particular viewing device or user account may be used to identify the user, determine one or more permissions or security actions available, or to allow one or more available features (e.g., bookmarking, note taking, object or component manipulation, etc.). The position and orientation of the requesting viewing device may correspond to an angle at which the viewing device "sees" the object. This is described below with respect to FIG. 8.

Based on a determined position and orientation, the visible shards of the object may be determined. Ordinarily, all shards of the 3D model may be selected as visible and processed to determine the 2D image displayed to the user. However, one or more culling techniques may be used to reduce the number of shards deemed as visible and therefore the amount of processing power needed. This can be done in several ways, including frustum culling, occlusion culling, and level of detail culling, for example.

Frustum culling may remove from consideration any shards that are completely outside a view frustum corresponding to the viewpoint of the viewing device. FIG. 8 illustrates an example view frustum 812. As such, when a user zooms in or can only see a subset of the total 3D model, shards corresponding to parts outside the view frustum may not be used to produce the 2D image of the model. In some examples, a given shard may be partially in and partially outside the view frustum. In these cases, any shard that is even partially in the view frustum may be considered, and only those shards that are completely outside the view frustum may be removed from consideration. In the example of FIG. 8, the seventh and eighth shards 531, 532 are completely outside the view frustum 812 and are thus excluded from consideration. In contrast, in the example of FIG. 8, the fifth shard 525 is partially present in the view frustum 812 and will thus be considered.

Occlusion culling may include determining one or more shards that are either partially or completely blocked by another shard, with respect to the determined viewpoint. For example, FIGS. 5, 6, and 8 show that the sixth shard 526 is blocked from view by viewpoint 804 by the first, second and fourth shards 521, 522, 524. As such, the sixth shard 526 may be removed from consideration, and not processed to determine the 2D image transmitted to the viewing device.

Level of detail culling may include determining whether a given shard should be removed from consideration based on the level of detail of the object shown. For instance, where the viewpoint is far away from the object, a given shard may take up one pixel or a small number of pixels. In this case, the shard may be removed from consideration when doing so would not greatly affect the image. The resolution and viewpoint position/orientation may cause one or more shards to be removed from consideration and to not be processed.

Once the list of shards is determined based on the culling techniques listed above, and one or more other processing techniques, a plurality of processing tasks may be determined. The processing tasks may each correspond to a visible shard or plurality of visible shards, and may include rendering the shard or shards. Put another way, once the list of visible shards is determined the shards may be independently processed to determine a plurality of 2D rendered images, which may then be combined and sent to the viewing device.

Each of the plurality of tasks may be a rendering task, which may be performed by one or more computing devices. In some examples, one or more subscriber devices may be used to process the tasks in series on a first come first served basis. For instance, where there are 10 shards visible, there may be 10 rendering tasks which must be completed to determine the 2D image to be presented to the viewing device. In some examples, there may be a single subscriber device that completes all the rendering tasks. There may also be two or more subscriber devices, which may process the 10 rendering tasks in parallel. For instance, the first subscriber may take the first rendering task while the second subscriber takes the second rendering task. The first subscriber may include a more powerful processor than the second subscriber, and as such may complete the first rendering task quickly. The first subscriber may then take and complete the third rendering task, and then take and complete the fourth rendering task before the second subscriber has completed the second rendering task. As such, rendering tasks may be completed in any order, in parallel, and by one or more devices. In this manner, a plurality of subscriber devices may complete the rendering tasks in an efficient manner such that the subscriber with the fastest processor may complete more rendering tasks than a slower subscriber.

Each processing task may include rendering a visible shard. In some examples, this may include performing a 3D rendering operation based on the determined viewpoint location, such as ray tracing, rasterization, or other such operations that project 3D geometric shapes onto two dimensions. Examples disclosed herein may be described with respect to ray tracing in particular, however it should be noted that any other operation for projecting 3D geometric shapes on to two dimensions may be used. A subscriber completing the rendering task may receive an identifier of a shard that must be rendered, and responsively retrieve the triangles that make up the shard from the database. The subscriber may then perform a ray tracing operation, to determine a color and depth for each pixel. The ray tracing operation may be understood as sending out a ray starting at the viewpoint location, passing through each pixel that will be displayed. The ray may pass through the pixel and contact a triangle of the shard being rendered. The ray may then bounce off the triangle and contact one or more other triangles or light sources. The color of a given pixel may correspond a component to which the triangle belongs. Each pixel may also include shading and lighting information, which may correspond to a depth of the triangle that corresponds to the pixel. As such, each rendered pixel may comprise both color and depth information. The depth of a given pixel may be determined as a one-dimensional distance along the ray to the intersection of the ray and the intersected triangle, or other 3D geometric primitive (cube, cone, polygons, B-reps, CSG trees, etc.). Ray tracing is further explained below in conjunction with FIG. 11.

In some examples, a derivative 3D rendering acceleration data structure such as a boundary volume hierarchy (BVH), voxel hierarchy, spatial grid, etc. may be determined for each shard. Examples disclosed herein may be described with respect to a BVH, but it should be noted that other data structures can be used as well. The BVH may be stored and accessed by one or more subscribers, such that when a given shard must be rendered it can be rendered more quickly. This may be particularly useful when a viewpoint changes and a shard must be re-rendered, and a new subscriber is tasked with rendering the shard. In this case, the BVH may be retrieved by the subscriber from the database, and used to more quickly render the shard.

3D rendering acceleration data structures such as a BVH may reduce the number of ray-triangle (or other geometric primitive) intersection tests that must be performed against a single ray in a ray tracing or scan line rasterization. This reduction is achieved by grouping triangles (or other geometric primitives) spatially and representing the group with another, single geometric primitive. As the surrogate primitives are created they may be recursively, progressively grouped with other primitives into a hierarchical tree structure. Intersections performed top-down against this tree structure effectively and efficiently enable culling of entire branches of the tree. This eliminates substantial numbers of leaf geometric primitives against which intersection tests must be performed.

Voxels (e.g., the plurality of voxels 710) may be used in one or more culling operations in order to determine the minimum plurality of shard processing jobs or rendering jobs required to produce a single laminate. As shown in FIG. 7, the shards 521-526, 531, 532 occupy at least one voxel 710. In other words, each of the shards 521-526, 531, 532 corresponds to at least one three-dimensional quantized block of space of the reference frame 306—one of the voxels 710. Thus, whether a voxel 710 is present in the view frustum 812, whether the voxel 710 contains a shard, and which shard the voxel 710 contains may be determined by the model viewer 202, as will be explained in greater detail below in conjunction with FIG. 8.

In some examples, rasterization or another rendering technique may be used instead of ray tracing. Then, regardless of the technique used, the processing task (i.e., rendering task) may result in a 2D image comprising pixels having color and depth information corresponding to a given shard. Where multiple shards are visible, multiple 2D images may be determined. The multiple 2D images may then be combined into a single 2D image comprising the plurality of visible shards. This combined 2D image may then be transmitted to the viewing device.

FIG. 8 illustrates the example 3D model 302 viewed by the viewpoint 804 via the model viewer 202 of FIG. 2. In the illustrated example of FIG. 8, the viewpoint 804 is depicted as a motion-picture film camera. The viewpoint 804 is associated with one of the viewing devices 114 of FIG. 1. It should be understood that each of the viewing devices 114 is associated with a respective viewpoint and that multiple viewpoints may view the 3D model 302 simultaneously. As shown in FIG. 8, the viewpoint 804 views the 3D model through the view frustum 812. In other words, the viewpoint 804 sees the portions of the 3D model 302 that are included in the view frustum 812. Thus, as shown in FIG. 8, portions of the 3D model 302 outside of the view frustum 812 are hidden from the viewpoint 804. In operation, the 3D model 302 remains stationary in the reference frame 306 while the viewpoint 804 moves about, translates, approaches (e.g., zooms in), and retreats (e.g., zooms out) in the reference frame 306 with respect to the 3D model 302, as indicated by the double arrows 808 and arrowed arcs 810. As an analogy, the 3D model acts as a fixed statue and the viewpoint 804 is an observer walking around the statue to look at all sides of the statute. In operation, 2D assembled laminate images of the 3D model 302 based on the respective positions of the viewpoints observing the 3D model (including viewpoint 804) are rendered and communicated by the servers 112 of FIG. 1 for display on the viewing devices 114 of FIG. 1. In other words, what the viewpoints (e.g., viewpoint 804) sees is shown as 2D laminates on the viewing devices 114. In yet other words, users view 2D laminates of the 3D model 302 from the vantage points of the viewpoints via the viewing devices 114. It should be understood and appreciated that generating and communicating 2D laminates of the 3D model 302 is more efficient than transmitting all the data that makes up the 3D model and rendering/re-rendering the 3D model for different viewpoints. In other words, it is easier to store all the 3D model data at one or more server locations (e.g., in the cloud) and send simple 2D laminate images to the viewing devices 114 than to transmit the 3D model data. Thus, data transmission efficiency is improved by reducing the amount of data transferred to the viewing devices 114. In operation, the viewpoint determiner 210 of FIG. 2 determines the positions of the viewpoints in the reference frame 306.

As shown in FIG. 8, voxels 710 containing the first, second, third, fourth, fifth, and sixth shards 521, 522, 523, 524, 525, 526 are disposed in the view frustum 812 and are thus visible to the viewpoint 804. Voxels 710 containing the seventh and eighth shards 531, 532 are outside of the view frustum 812 and are thus hidden from the viewpoint 812. Thus, the first, second, third, fourth, fifth, and sixth shards 521, 522, 523, 524, 525, 526 make up a visible shard set 820. It should be understood and appreciated that despite being only partially included in the view frustum 812, as shown in FIG. 8, the fifth shard 525 is included in the visible shard set 820. Looking at FIGS. 6, 7, and 8, it should be further understood and appreciated that despite being obscured by the first shard 521, the sixth shard 526 is present in the view frustum 812 and is thus included in the visible shard set 820. Further, because the seventh and eighth shards 531, 532 are in voxels 710 completely outside the view frustum 812, the seventh and eighth shards 531, 532 make up a hidden shard set 830. In other words, from the vantage point of the viewpoint 804, the visible shard set 820 is visible while the hidden shard set 830 is hidden from view.

In operation, using the examples of FIGS. 3-7 the visible shard determiner 204 makes a visible shard determination that the first, second, third, fourth, fifth, and sixth shards 521, 522, 523, 524, 525, 526 are visible to the viewpoint 804 based on the position of the viewpoint 804 in the reference frame 306. In other words, for the examples of FIGS. 3-7, the visible shard determiner 204 determines that a set of visible shards—the visible shard set 820—for the viewpoint 804 includes the first, second, third, fourth, fifth, and sixth shards 521, 522, 523, 524, 525, 526. Further in operation, the visible shard determiner 204 communicates the visible shard set 820 to the tile generators 206a to 206n. It should be appreciated that the visible shard determination made by the visible shard determiner 204 is quantized. In other words, even if only a portion of a shard is visible for a given viewpoint or the shard is obscured, the visible shard determiner 204 includes the partially-visible and/or obscured shard in the set of visible shards, as described above with respect to the fifth and sixth shards 525, 526.

Figure 9:
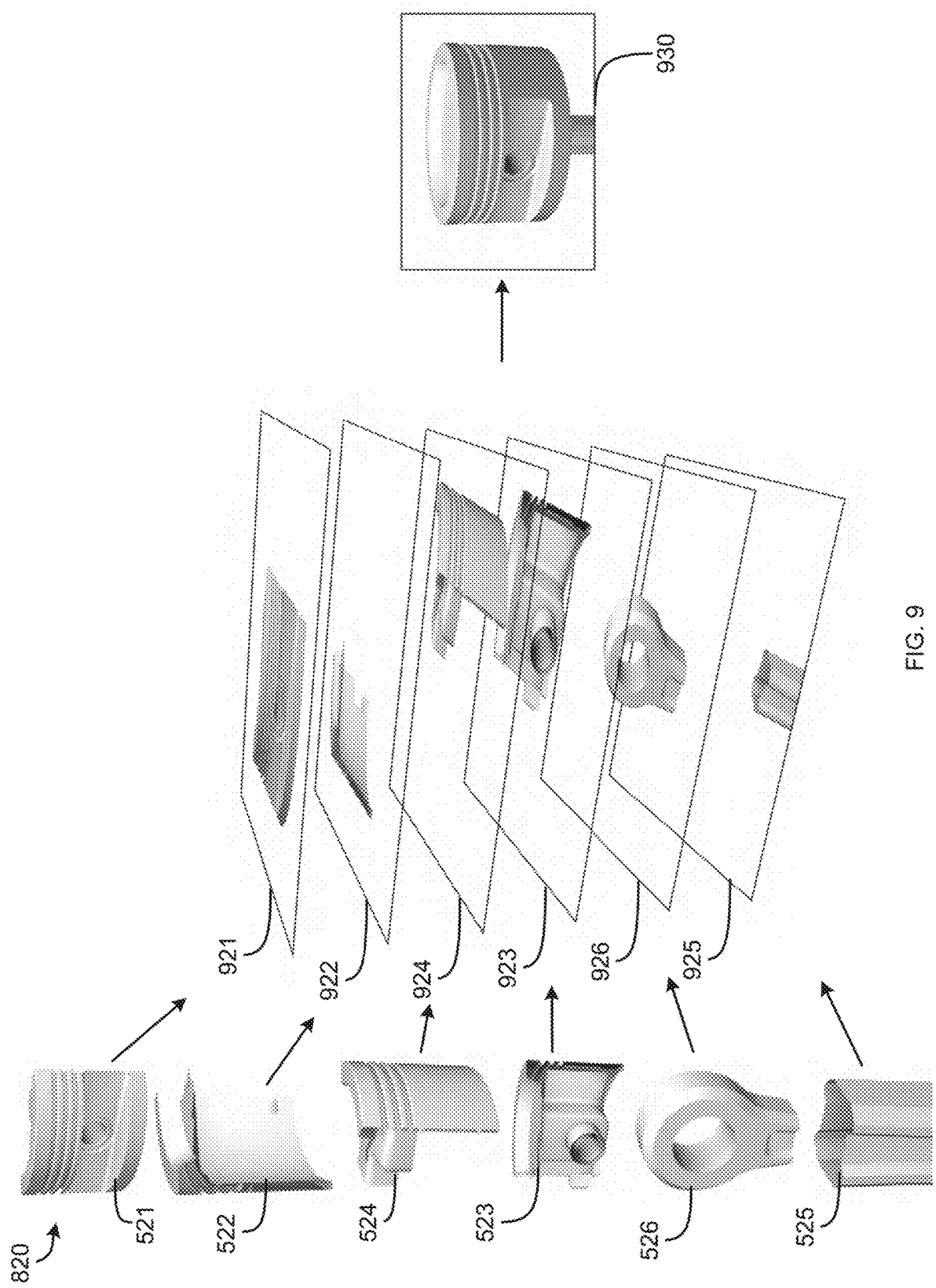
FIG. 9 illustrates a shard set of the example 3D model visible via the viewpoint of FIG. 8, corresponding 2D tiles generated by the model viewer of FIG. 2, and a 2D laminate generated by the model viewer.
Figure 10A:
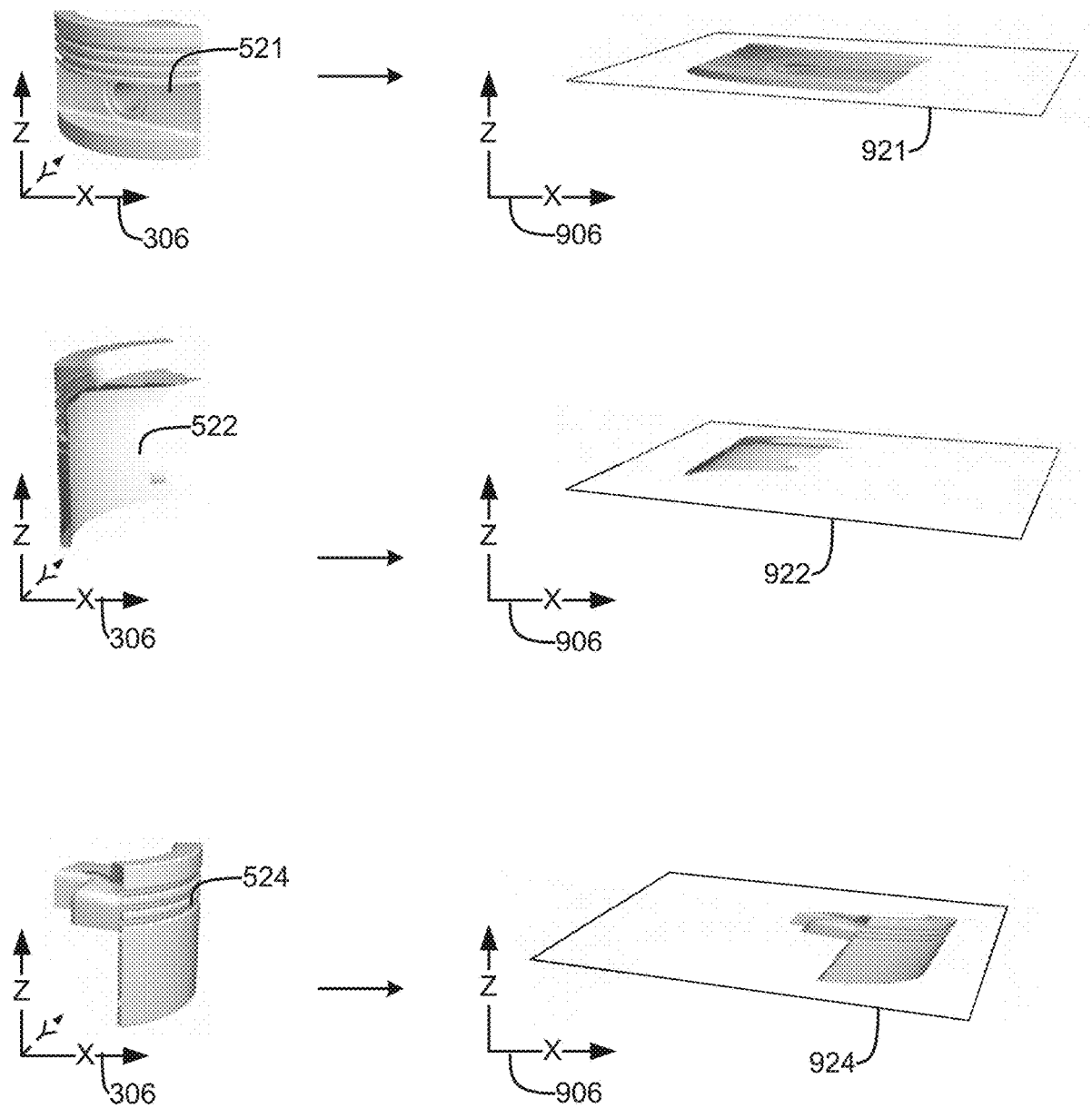
FIG. 10A illustrates example 2D tiles of the example 3D model of FIGS. 3-6 generated by the example model viewer of FIG. 2.
Figure 10B:
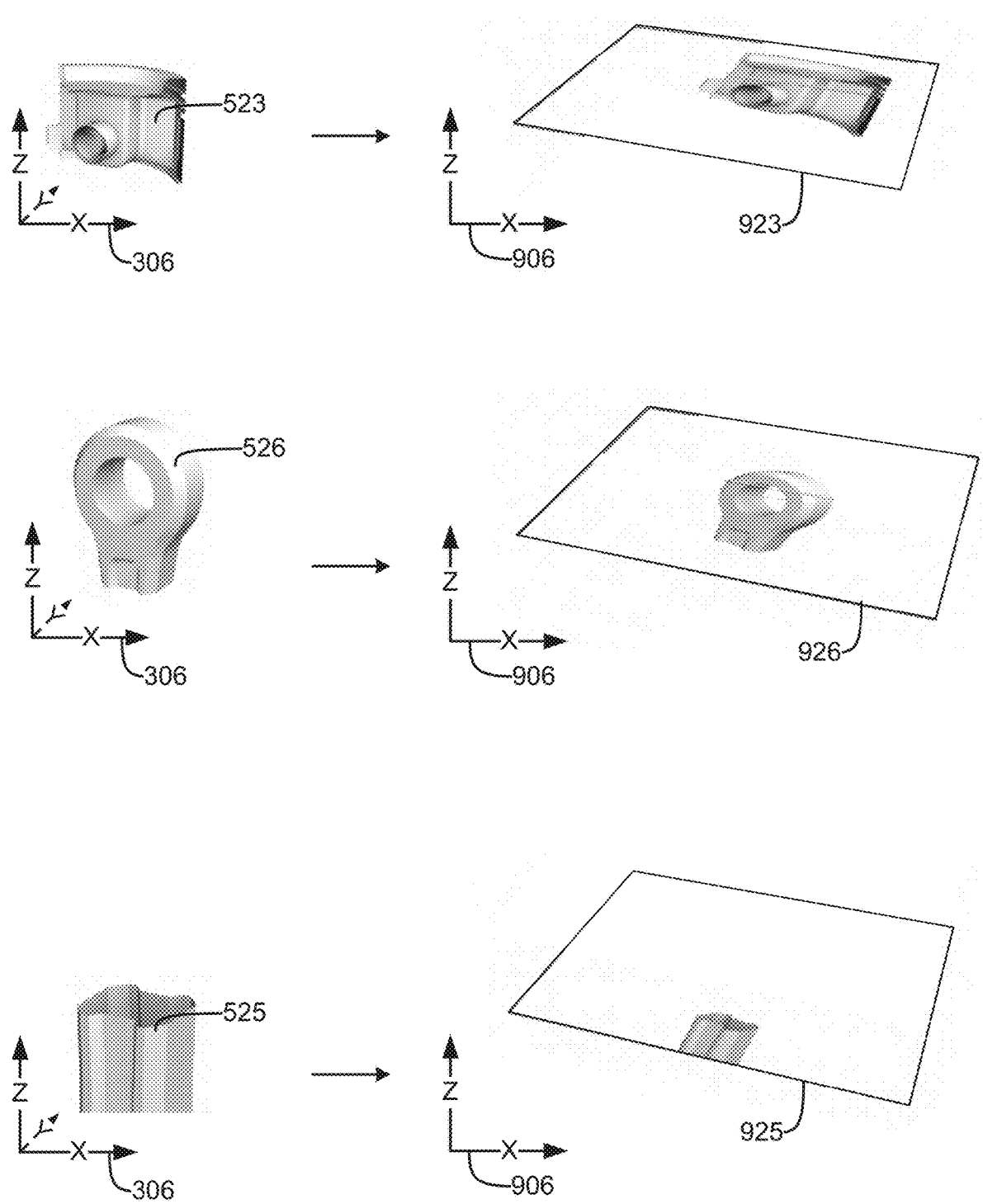
FIG. 10B illustrates example 2D tiles of the example 3D model of FIGS. 3-6 generated by the example model viewer of FIG. 2.
Figure 11:
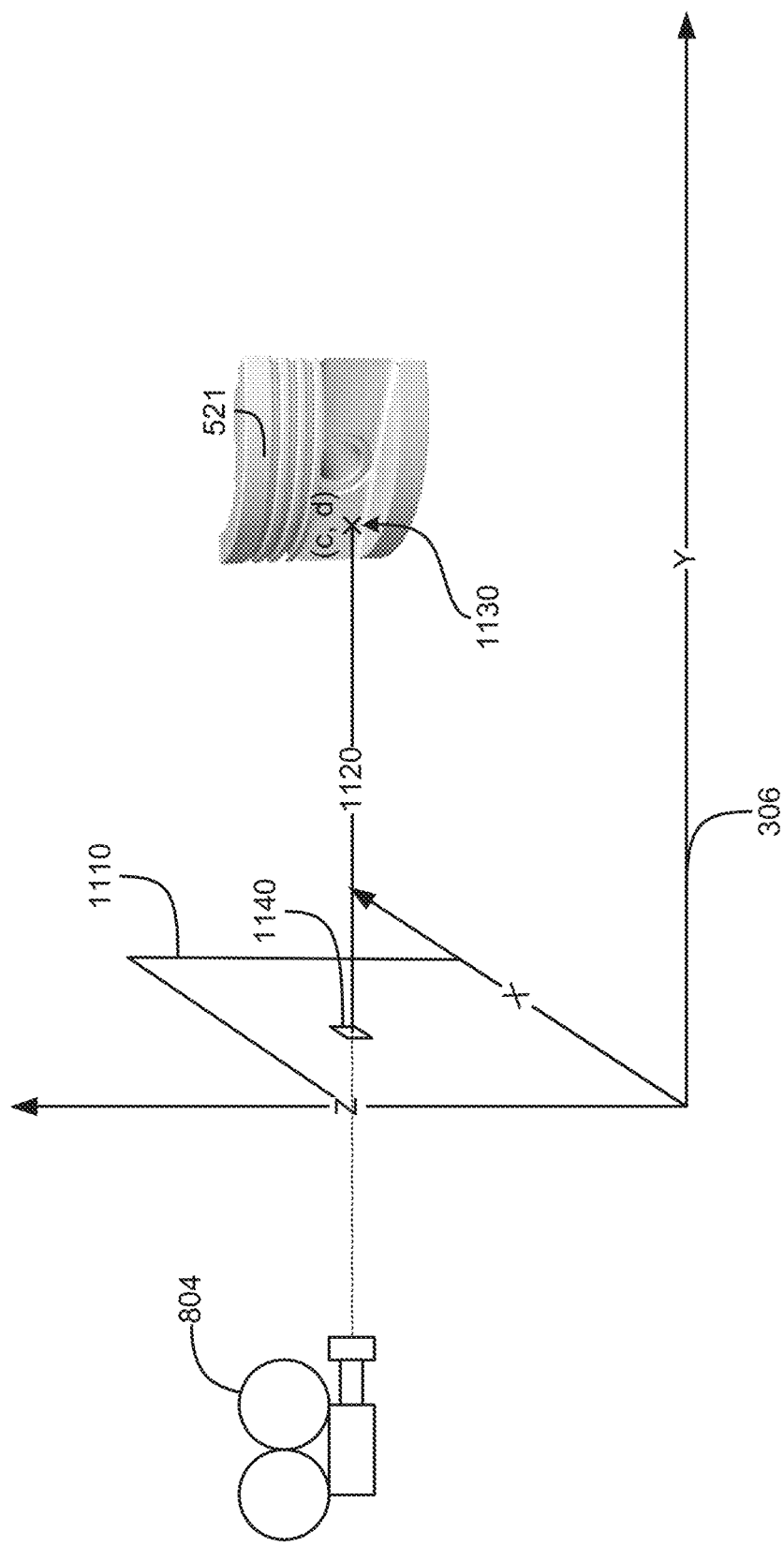
FIG. 11 is a side view of a ray corresponding to the viewpoint intersecting one of the visible shards of FIG. 9

FIG. 9 illustrates the visible shard set 820 of the example 3D model 302, corresponding 2D tiles generated by the model viewer 202, and a 2D laminate 930 generated by the model viewer 202. FIGS. 10A and 10B illustrate example 2D tiles of the example 3D model 302 generated by the example model viewer 202. FIG. 11 is a side view of a ray 1120 corresponding to the viewpoint 804 intersecting the first shard 521, which is part of the visible shard set 820.

In operation, the tile generators 206a to 206n generate 2D tiles for the viewpoint 804 based on the visible shard set 820 shown in FIG. 8. More specifically, one or more of the tile generators 206a to 206n retrieve the first, second, third, fourth, fifth, and sixth shards 521, 522, 523, 524, 525, 526, the from the database 218 of FIG. 2. In other words, individual shards of the set of visible shards 820 may be distributed amongst multiple tile generators 206. The tile generators 206a to 206n respectively render (flatten) the 3D the first, second, third, fourth, fifth, and sixth shards 521, 522, 523, 524, 525, 526, into 2D tiles. As shown in FIGS. 9, 10A, and 10B, the first shard 521 is flattened in a 2D first tile 921. The second shard 522 is flattened into a 2D second tile 922. The third shard 523 is flattened into a 2D third tile 923. The fourth shard 524 is flattened into a 2D fourth tile 924. The fifth shard 525 is flattened into a 2D fifth tile 925. The sixth shard 526 is flattened into a 2D sixth tile 926. As shown in FIGS. 10A and 10B, the first, second, third, fourth, fifth, and sixth tiles 921, 922, 923, 924, 925, 926 are in a 2D reference frame 906. Thus, the entire set of visible shards 820 is flattened into 2D tiles by the tile generators 206a to 206n.

In the illustrated example of FIG. 11, the ray 1120 extends perpendicularly from a pixel 1140 of a viewing plane 1110. The viewing plane 1110 is the 2D area visible by the viewpoint 804 in the view frustum 812. It should be understood that the viewing plane 1110 includes a plurality of pixels such as the pixel 1140 arranged in columns and rows. As shown in FIG. 11, the first shard 521 has a color value c (e.g., red, blue, green, gray, or any color on the visible spectrum) and a depth value d at the intersection point 1130 where the ray 1120 intersects the first shard 521. This color and depth data is collectively shown as (c, d) in FIG. 11. The depth value d is a distance from the viewing plane 1110 to the intersection point 1130. The color value c is the color of the first shard 521 at the intersection point 1130 as viewed by the viewpoint 804 via the viewing plane 1110 at the pixel 1140. In other words, as the viewpoint 804 looks at the viewing plane 1110, pixel 1140 has color value c and is associated with depth value d.

In operation, the tile generators 206a to 206n determine color and depth data for individual visible shards for every point where a ray intersects the visible shard. Thus, for each individual visible shard, color and depth data is generated for each pixel of the viewing plane through which the individual shard is seen. The color data from each pixel forms a 2D tile and the depth data is associated with each pixel (e.g., as metadata). In other words, a 2D tile is a collection of colored pixels and depth data is associated with each of the colored pixels. The tile generators 206a to 206n provide the tiles and associated depth data to the laminate assembler 208. In some examples, the tile generators 206a to 206n may further determine transparency data for visible shard ray intersection points.

In operation, the laminate assembler 208 sends pairs of tiles (e.g., first tile 921 with sixth tile 926, third tile 923 with fourth tile 924, etc.) and associated depth and transparency data to the tile compositors 212a to 212n to be merged into composite tiles. Thus, the work of compositing the pairs of tiles is spread amongst the tile compositors 212a to 212n.

In operation, the tile compositors 212a to 212n compare the respective depth data of each pixel of the tiles provided by the laminate assembler 208. For a given pixel location in the tiles, the tile compositors 212a to 212n select the colored pixel between the pair of tiles having the smallest depth value. In other words, a tile compositor 212 merges a pair of tiles into a composite tile based on which pixels between the pair of tiles were closest to the viewing plane 1110. Thus, each composite tile is a collection of the colored pixels between the pair of tiles that were nearest to the viewing plane 1110. Further, each pixel of the composite tile thus has color data and depth data. The tile compositors 212a to 212n then deliver the composite tiles to the laminate assembler 208. In examples where the tiles include transparency data, the tile compositors 212a to 212n adjust the color data of the selected pixel based on the transparency data and the color data of the non-selected pixel.

Further in operation, the laminate assembler 208 continues the tile compositing process by sending pairs of composite tiles and original tiles or pairs of composite tiles to the tile compositors 212a to 212n until all of the tiles originally delivered by the tiles generators 206a to 206n are composited into a final laminate 930. In the example of FIG. 9, the 2D laminate 930 is a composited 2D image of the 3D model 302 as observed by the viewpoint 804 in the view frustum 812.

Further, the laminate assembler 208 sends the 2D laminate 930 to the viewing device 114 for display on the viewing device 114. In other words, as shown in FIG. 9, the tile generators 206a to 206n convert the visible shard set 820 into 2D tiles 921-926, the tile compositors 212a to 212n successively composite the tiles 921-926 according to pixel depth data into the laminate 930, and the laminate assembler 208 delivers the laminate 930 to the viewing device 114.

Figure 12:
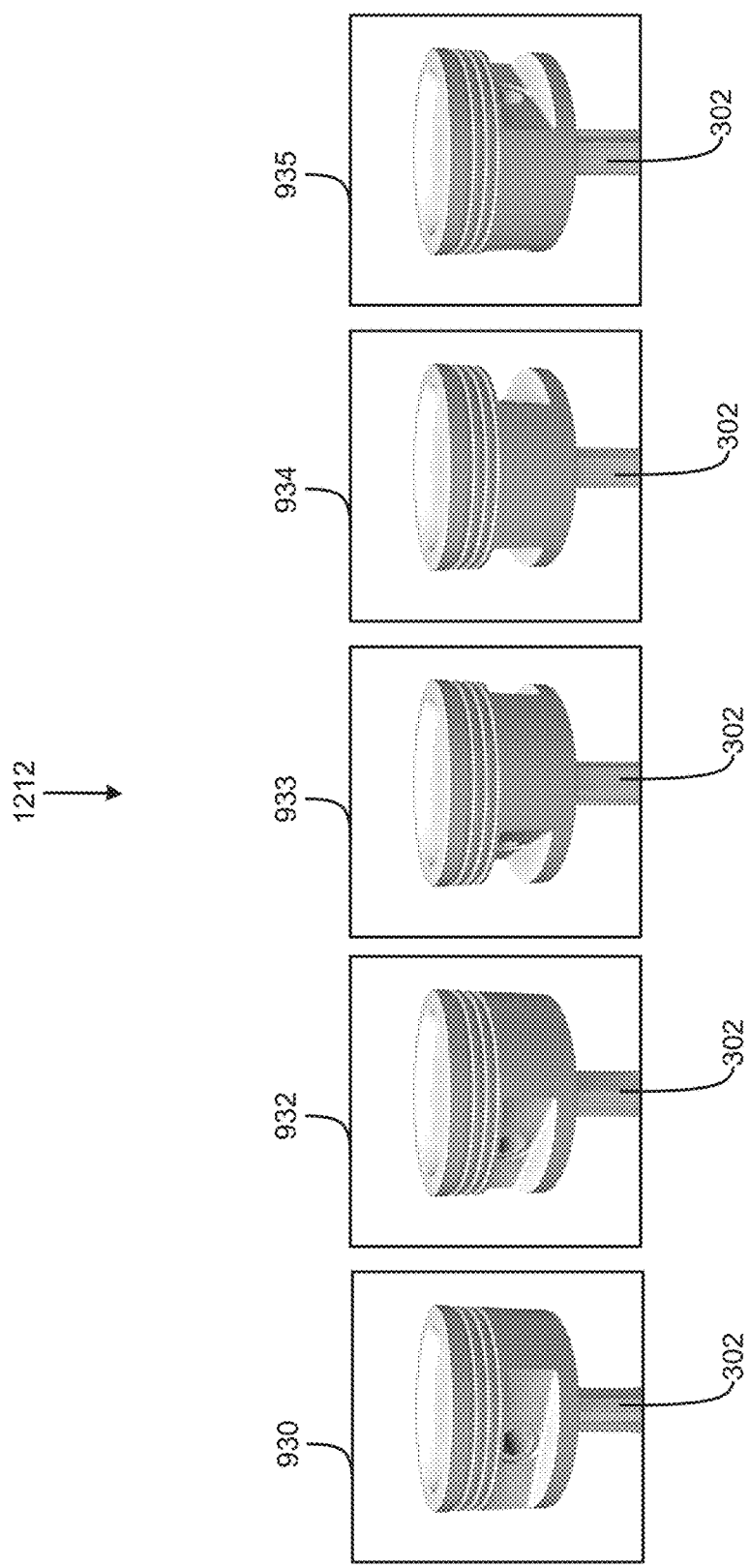
FIG. 12 illustrates a collection of 2D laminates of the example 3D model generated by the example model viewer of FIG. 2.

FIG. 12 illustrates a collection of 2D laminates 1212 of the example 3D model 302 generated by the example model viewer 202 of FIG. 2. In the illustrated example of FIG. 12, the collection of 2D laminates 1212 includes the first laminate 930 of FIG. 9, a second laminate 932, a third laminate 933, a fourth laminate 934, and a fifth laminate 935. Each of the first, second, third, fourth, and fifth laminates 930, 932, 933, 934, 935 respectively correspond to different viewpoint positions in a reference frame (e.g., the reference frame 306 of FIGS. 3-11) about the example 3D model 302. In other words, the first, second, third, fourth, and fifth laminates 930, 932, 933, 934, 935 are images of what is observed by the viewpoint 804 of the 3D model 302 at first, second, third, fourth, and fifth positions in the reference frame 306.

In operation, for the example of FIG. 12, the tile generators 206a to 206n, the tile compositors 212a to 212n, and the laminate assembler 208 of FIG. 2 successively generate the first, second, third, fourth, and fifth laminates 930, 932, 933, 934, 935 as the viewpoint 804 is moved in the reference frame 306. In operation, the tile generators 206a to 206n generate 2D tiles and the tile compositors 212a to 212n composite 2D laminates as the viewpoint 804 is moved between viewpoint positions according to a frame rate (e.g., 24 frames per second, 40 frames per second, etc.). The tile generators 206a to 206n do not generate new 2D tiles when the viewpoint remains fixed at a viewpoint location in virtual 3D space, thus conserving processing capacity. In other words, the tile generators 206a to 206n generate 2D tiles for composition into 2D laminates by the tile compositors 212a to 212n in response to movement inputs from a viewing device 114.

Further in operation, the interface 214 of FIG. 2 displays the rapidly-generated laminates at a viewing device (e.g., one of the viewing devices 114 of FIG. 1). Thus, an illusion of motion (e.g., rotation, translation, etc.) of the 3D model is produced for a user of the viewing device by rapidly displaying the static laminates on the viewing device. In other words, the model viewer 202 creates an electronic flipbook of static laminates that are rapidly shown to a user via the viewing device 114. In the illustrated example of FIG. 12, the 3D model 302 thus appears to rotate in the collection of laminates 1212. Returning to the statue analogy, the model viewer 202 flips a stack of 2D images taken about the fixed statue in front of a user. Although the user may be standing still, the statue appears to rotate in front of the user. Thus, in the illustrated example of FIG. 12, the 3D model 302 appears to rotate as the first, second, third, fourth, and fifth laminates 930, 932, 933, 934, 935 progress from left to right.

Embodiments included herein have been described involving the display of various images, laminates, shards, and other visual features on a screen or display device. It should be appreciated that certain examples may include the use of the concepts described herein in the context of augmented reality and/or virtual reality applications. In an augmented reality context, images, laminates, shards, or other visual features may be provided along with a transparent background. The transparent background may allow a display device to superimpose the provided image onto a local camera image or view, such that the object in the image, laminates, or shards appears to be located within the camera field of view. This is one example of how the disclosed concepts can be used with augmented reality. It should be appreciated that other techniques may be used as well. Additionally, the concepts disclosed herein may be used in a virtual reality context. For example, multiple images, laminates, or displayed shards may be provided to a device in a stereographic manner to enable the device to be used for a virtual reality display. Providing dual images for a stereographic display using the techniques and concepts disclosed herein can remove the need for significant processing at the display device itself. In this way, the virtual reality display device can be more compact, power efficient, and of a simpler and more cost-effective design.

Figure 13:
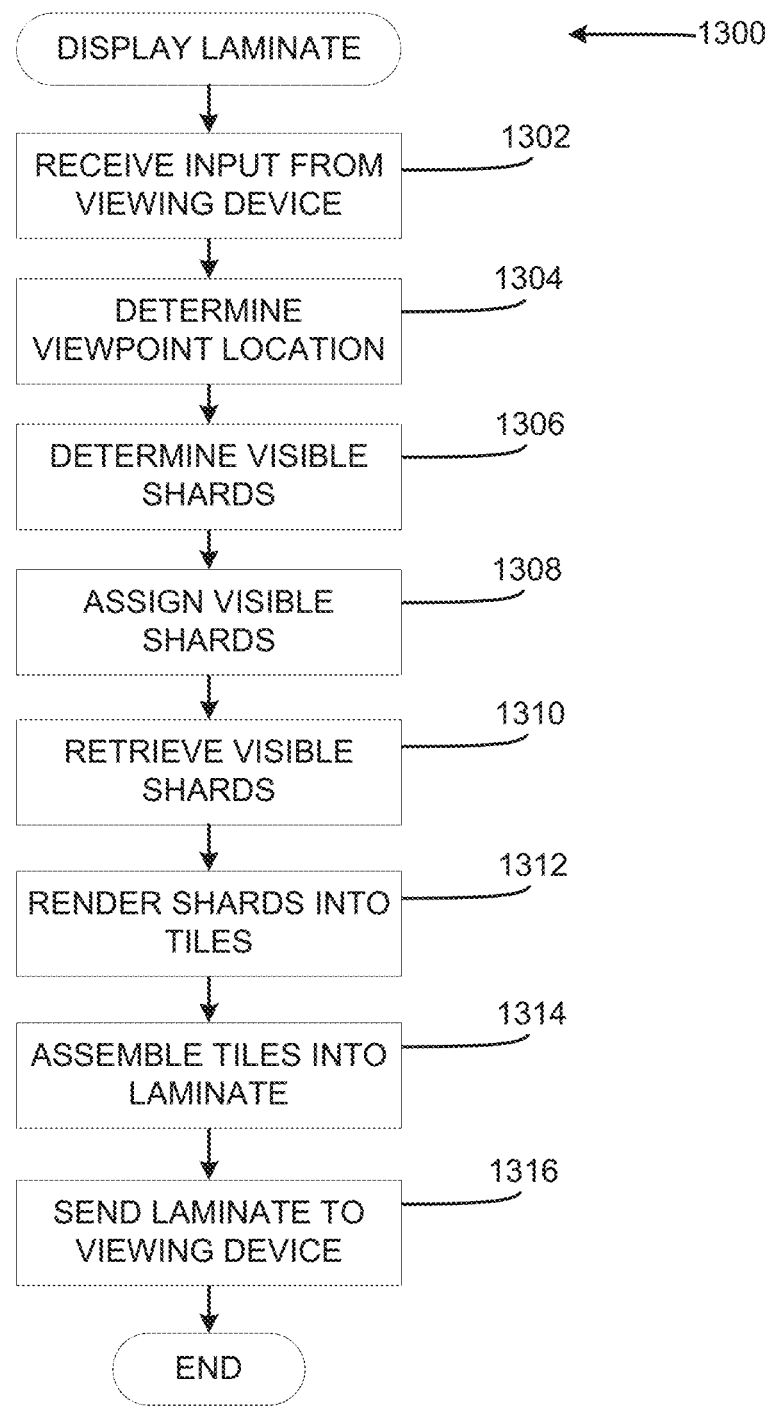
FIG. 13 is flowchart representative of machine readable instructions that may be executed to implement the example model viewer of FIG. 2 to display a 2D laminate.

FIG. 13 is flowchart representative of machine readable instructions that may be executed to implement the example model viewer 202 of FIG. 2 to display a laminate. The flowchart of FIG. 13 is representative of machine readable instructions that are stored in memory (such as the memory 1404 of FIG. 14) and include one or more methods which, when executed by a processor (such as the processor 1406 of FIG. 14), cause the environment 110 to implement the example model viewer 202 of FIG. 2. While example program 1300 is described with reference to the flowchart illustrated in FIG. 13, many other methods of implementing the example model viewer 202 may alternatively be used. For example, the order of execution of the blocks may be rearranged, changed, eliminated, and/or combined to perform the methods 1300. Further, because the method 1300 is disclosed in connection with the components of FIG. 2, some functions of those components will not be described in detail below.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example of FIG. 13, the example interface 214 receives an input (e.g., a movement input, a laminate display request, etc.) from a viewing device 114 (block 1302). The viewpoint determiner 210 determines a viewpoint location in a reference frame associated with a 3D model corresponding to the input (block 1304). The visible shard determiner 204 accesses the database 218 to determine a visible shard set of the 3D model based on the viewpoint location (block 1306). The visible shard determiner 204 assigns individual shards of the visible shard set to the tile generators 206a to 206n (block 1308). The tile generators 206a to 206n retrieve the assigned visible shards from the database 218 (block 1310). The tile generators 206a to 206n render the assigned visible shards into 2D tiles and deliver the 2D tiles to the laminate assembler 208 (block 1312). The tile compositors 212a to 212n successively merge 2D tiles received from the laminate assembler 208 to assemble the 2D tiles into a 2D laminate (block 1314). The interface 214 sends the 2D laminate to the viewing device 114 (block 1316). The method 1300 then ends.

Figure 14:
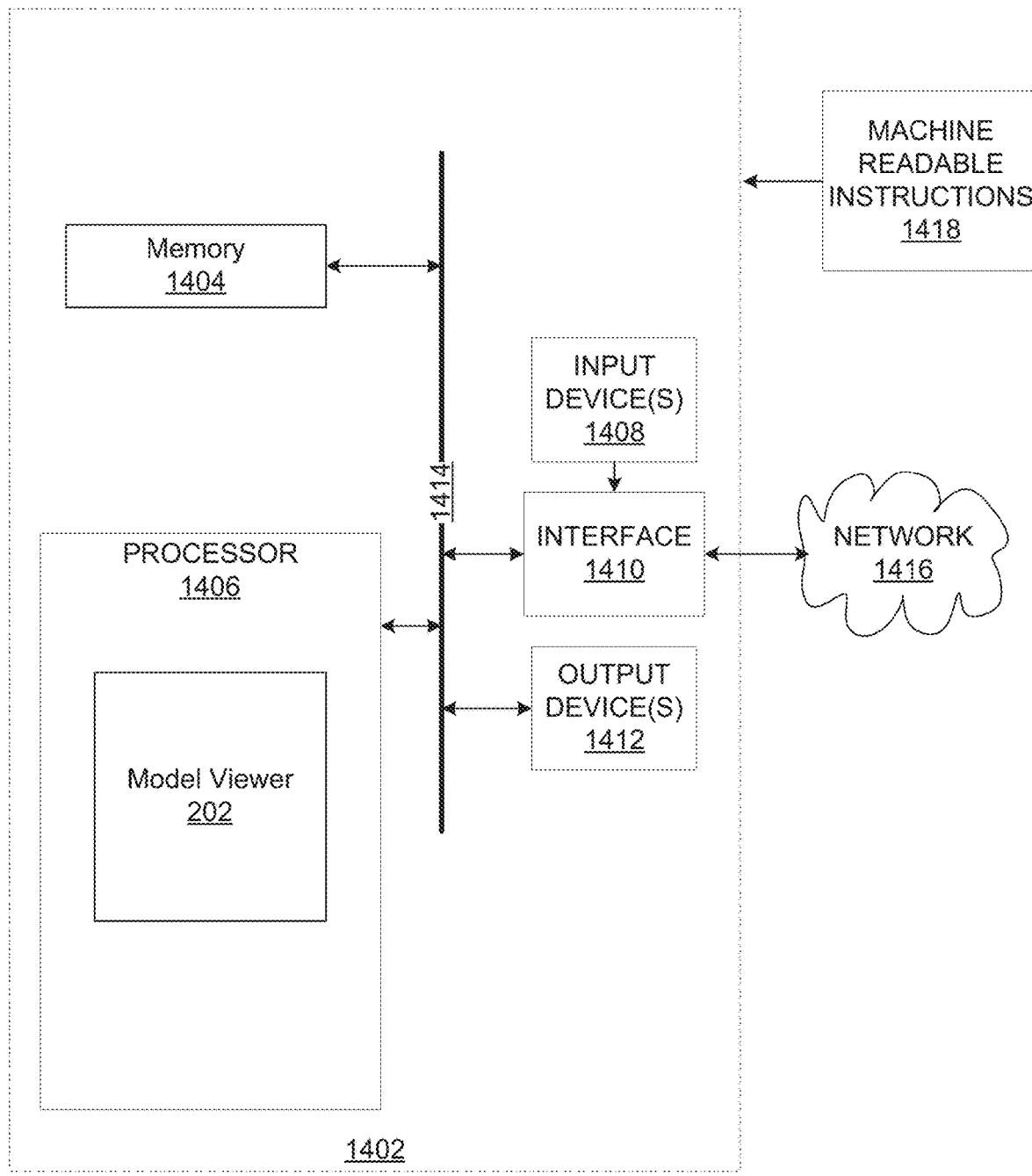
FIG. 14 is a block diagram of an example computer platform capable of executing the instructions of FIG. 13 to implement the example model viewer of FIG. 2.

FIG. 14 is a block diagram of an example computing platform 1402 capable of executing the instructions of FIG. 13 to implement the example model viewer 202 of FIG. 2. In the illustrated example of FIG. 14, the computing platform 1402 includes a memory 1404, a processor 1406, input device(s) 1408, an interface 1410, output device(s) 1412, and a bus 1414.

In the illustrated example of FIG. 14, the memory 1404, the processor 1406, the interface 1410, and the output device(s) 1412 are in communication with one another via the bus 1414. The input device(s) 1408 are in communication with the interface 1410.

In the illustrated example of FIG. 14, the processor 1406 of the on-board computing platform 1402 is structured to include the model viewer 202. The processor 1406 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 1404 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 1404 includes multiple kinds of memory, particularly volatile memory and non-volatile memory.

The memory 1404 is computer readable media on which one or more sets of instructions 1418, such as the software for operating the methods of the present disclosure, can be embedded. The instructions 1418 may embody any one or more of the methods or logic as described herein. For example, the instructions 1418 reside completely, or at least partially, within any one or more of the memory 1404, the computer readable medium, and/or within the processor 1406 during execution of the instructions 1418.

The interface 1410 may be implemented by any type of interface standard (e.g., Ethernet, universal serial bus (USB), and/or a peripheral component interconnect (PCI) express interface). The interface 1410 includes a communication device (e.g., a transmitter, a receiver, a transceiver, a modem, network interface card, etc.) to exchange data with external machines and/or computing devices via a network 1416 (e.g., an Ethernet connection, wireless connection, a telephone line, coaxial cable, a cellular telephone system, etc.).

The machine readable instructions 1418 may be stored in the memory 1404 and/or on a removable tangible computer readable medium storage (e.g., a compact disc, a digital versatile disc, a Blu-ray disc, a USB drive, etc.).

In the illustrated example of FIG. 14, the input device(s) 1408 enable a user, such as an operator or technician, to provide instructions, commands, and/or data to the processor 1406. Examples of the input device(s) 1408 include one or more of a button, a control knob, an instrument panel, a touch screen, a touchpad, a keyboard, a mouse, a speech recognition system, etc.

The output device(s) 1412 of the illustrated example display output information and/or data of the processor 1406 to a user, such as an operator or technician. Examples of the output device(s) 1412 include a liquid crystal display (LCD), an organic light emitting diode (OLED) display, a flat panel display, a touch screen, a solid state display, and/or any other device that visually presents information to a user. Additionally or alternatively, the output device(s) may include one or more speakers and/or any other device(s) that provide audio signals for a user. Further, the output device(s) 1412 may provide other types of output information, such as haptic signals.

From the foregoing, it will be appreciated that the above disclosed methods and apparatus may aid in simultaneous viewing of 3D models during a product design process. Thus, users may collaborate with one another in real time to make comments regarding the product represented by the 3D model. Additionally, the above disclosed methods and apparatus provide a specific improvement to computer-related technology by reducing the number of times large 3D model files are transferred via email, FTP, etc. during a design process, thus freeing a processor to perform other tasks more quickly and consuming less energy.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus comprising:
   a viewpoint determiner to determine a viewpoint location of a viewpoint corresponding to a viewing device, the viewpoint location being in a reference frame of a three-dimensional model;
   a visible shard determiner to determine a visible shard set of the three-dimensional model based on the viewpoint location, wherein the visible shard determiner utilizes the viewpoint location relative to a complete spatially indexed shard set to determine the visible shard set associated with the determined viewpoint location; and
   a tile compositor to generate a two-dimensional image associated with the reference frame of the determined viewpoint location of the three-dimensional model, wherein:
      the generated two-dimensional image is based on the visible shard set of the three-dimensional model, and
      the three-dimensional model existed prior to the generation of the two-dimensional image.

2. The apparatus of claim 1, wherein the tile generator retrieves the visible shard set from a database.

3. The apparatus of claim 1, wherein the visible shard determiner communicates the visible shard set to the tile generator.

4. A method comprising:
   determining, by executing an instruction with a processor, a viewpoint location of a viewpoint corresponding to a viewing device, the viewpoint location being in a reference frame of a three-dimensional model;
   determining, by executing an instruction with the processor, a visible shard set of the three-dimensional model based on the viewpoint location and utilizing the viewpoint location relative to a complete spatially indexed shard set; and generating, by executing an instruction with the processor, a two-dimensional image associated with the reference frame of the determined viewpoint location of the three-dimensional model, wherein the generated two-dimensional image is based on the visible shard set of the three-dimensional model, and the three-dimensional model existed prior to the generation of the two-dimensional image.

5. The method of claim 4, wherein generating the two-dimensional image includes retrieving the visible shard set from a database.

6. The method of claim 4, further comprising assigning individual shards of the visible shard set.

7. A non-transitory computer readable storage medium comprising computer readable instructions, which, when executed by a processor, cause the processor to at least:
   determine a viewpoint location of a viewpoint corresponding to a viewing device, the viewpoint location being in a reference frame of a three-dimensional model;
   determine a visible shard set of the three-dimensional model based on the viewpoint location and utilizing the viewpoint location relative to a complete spatially indexed shard set; and
   generate a two-dimensional image of the visible shard set associated with the reference frame of the determined viewpoint location of the three-dimensional model, wherein the three-dimensional model existed prior to the generation of the two-dimensional image.

8. The non-transitory computer readable storage medium of claim 7, wherein the instructions to generate the two-dimensional images cause the processor to retrieve the visible shard set from a database.

9. The non-transitory computer readable storage medium of claim 7, wherein when executed by the processor, the instructions further cause the processor to assign individual shards of the visible shard set.

* * * * *